(12) United States Patent
Hauck et al.

(10) Patent No.: US 7,490,174 B2
(45) Date of Patent: Feb. 10, 2009

(54) METHOD AND APPARATUS FOR BORDER NODE BEHAVIOR ON A FULL-DUPLEX BUS

(75) Inventors: Jerrold V. Hauck, Fremont, CA (US); Colin Whitby-Strevens, Ben Lomond, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 11/601,487

(22) Filed: Nov. 16, 2006

(65) Prior Publication Data

US 2007/0067523 A1  Mar. 22, 2007

Related U.S. Application Data

(60) Division of application No. 10/635,835, filed on Aug. 5, 2003, now Pat. No. 7,266,617, which is a continuation of application No. 09/484,479, filed on Jan. 18, 2000, now Pat. No. 6,639,918.

(51) Int. Cl.
  *G06F 3/00* (2006.01)
(52) U.S. Cl. ............................... 710/8; 710/11; 710/14; 710/33
(58) Field of Classification Search .................. 710/5, 710/8, 72
  See application file for complete search history.

(56) References Cited

U.S. PATENT DOCUMENTS

| | | | |
|---|---|---|---|
| 4,156,798 A | 5/1979 | Doelz | |
| 4,194,113 A | 3/1980 | Fulks et al. | |
| 5,014,262 A | 5/1991 | Harshavardhar | |
| 5,175,855 A | 12/1992 | Putnam et al. | |
| 5,274,631 A | 12/1993 | Bhardwaj | |
| 5,321,812 A | 6/1994 | Benedict et al. | |
| 5,343,461 A | 8/1994 | Barton et al. | |
| 5,390,301 A | 2/1995 | Scherf | |
| 5,394,106 A | 2/1995 | Black et al. | |
| 5,394,486 A | 2/1995 | Eisenbarth et al. | |
| 5,394,556 A | 2/1995 | Oprescu | |
| 5,406,643 A | 4/1995 | Burke et al. | |
| 5,430,486 A | 7/1995 | Fraser et al. | |
| 5,452,330 A | 9/1995 | Goldstein | |

(Continued)

FOREIGN PATENT DOCUMENTS

EP  1 085 706 A2  3/2001

(Continued)

OTHER PUBLICATIONS

Bebrojowski, Andrzej, "Transfer of the phase process through the border between two time scales" (Mar. 1996), European Time frequency conference.*

(Continued)

*Primary Examiner*—Tariq Hafiz
*Assistant Examiner*—Jasjit S Vidwan
(74) *Attorney, Agent, or Firm*—Gazdzinski & Associates

(57) ABSTRACT

A method and apparatus relating to the behavior of border nodes within a high performance serial bus system is disclosed.

Figure 1:
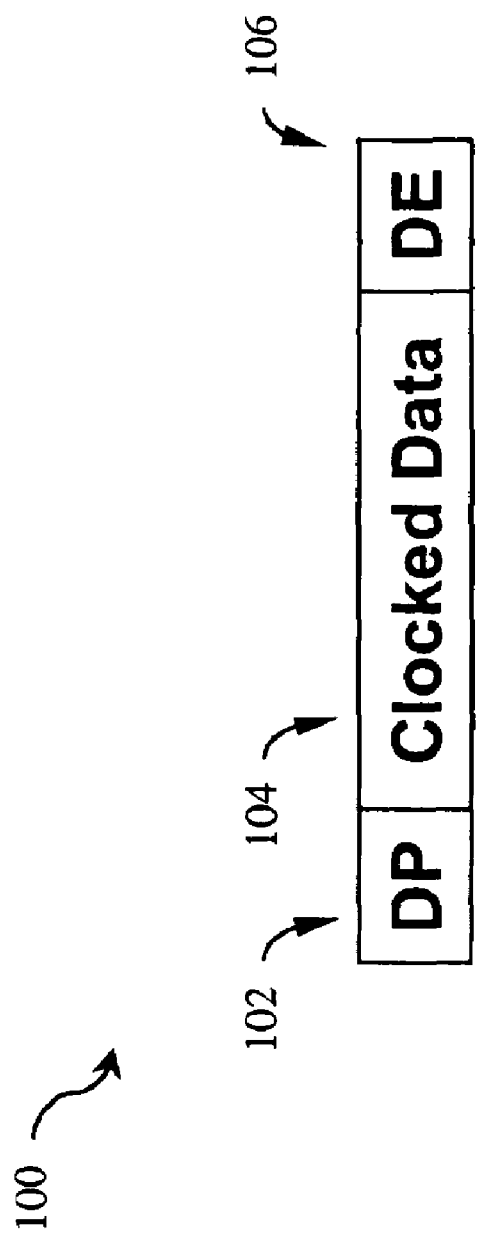

A method for determining and communicating the existence of a hybrid bus is disclosed. A method for determining a path to a senior border node is disclosed, as is a method for identifying a senior border node Various methods for properly issuing gap tokens within a beta cloud are disclosed.

43 Claims, 13 Drawing Sheets

Restoring Senior Border as BOSS
According to the Present Invention

U.S. PATENT DOCUMENTS

| | | |
|---|---|---|
| 5,490,250 A | 2/1996 | Reschke et al. |
| 5,490,253 A | 2/1996 | Laha et al. |
| 5,493,568 A | 2/1996 | Sampat et al. |
| 5,495,481 A | 2/1996 | Duckwall |
| 5,524,254 A | 6/1996 | Morgan |
| 5,539,390 A | 7/1996 | Nagano et al. |
| 5,541,670 A | 7/1996 | Hanai |
| 5,559,548 A | 9/1996 | Davis et al. |
| 5,563,886 A | 10/1996 | Kawamura et al. |
| 5,568,487 A | 10/1996 | Sitbon et al. |
| 5,568,641 A | 10/1996 | Nelson |
| 5,583,922 A | 12/1996 | Davis et al. |
| 5,621,659 A | 4/1997 | Matsumoto et al. |
| 5,630,173 A | 5/1997 | Oprescu |
| 5,632,016 A | 5/1997 | Hoch et al. |
| 5,640,595 A | 6/1997 | Baugher et al. |
| 5,642,515 A | 6/1997 | Jones et al. |
| 5,654,657 A | 8/1997 | Pearce |
| 5,684,715 A | 11/1997 | Palmer |
| 5,701,476 A | 12/1997 | Fenger |
| 5,701,492 A | 12/1997 | Wadsworth et al. |
| 5,706,278 A | 1/1998 | Robillard et al. |
| 5,712,834 A | 1/1998 | Nagano et al. |
| 5,719,862 A | 2/1998 | Lee |
| 5,754,765 A | 5/1998 | Danneels et al. |
| 5,764,930 A | 6/1998 | Staats |
| 5,784,648 A | 7/1998 | Duckwall |
| 5,802,048 A | 9/1998 | Duckwall |
| 5,802,057 A | 9/1998 | Duckwall et al. |
| 5,802,365 A | 9/1998 | Kathail et al. |
| 5,805,073 A | 9/1998 | Nagano et al. |
| 5,805,822 A | 9/1998 | Long et al. |
| 5,809,331 A | 9/1998 | Staats et al. |
| 5,819,115 A | 10/1998 | Hoese et al. |
| 5,826,027 A | 10/1998 | Pedersen et al. |
| 5,832,298 A | 11/1998 | Sanchez et al. |
| 5,835,761 A | 11/1998 | Ishii et al. |
| 5,844,619 A | 12/1998 | Songer |
| 5,845,152 A | 12/1998 | Anderson et al. |
| 5,867,730 A | 2/1999 | Leyda |
| 5,875,301 A | 2/1999 | Duckwall et al. |
| 5,923,663 A | 7/1999 | Bontemps et al. |
| 5,930,480 A | 7/1999 | Staats |
| 5,935,208 A | 8/1999 | Duckwall et al. |
| 5,938,764 A | 8/1999 | Klein |
| 5,940,600 A | 8/1999 | Staats et al. |
| 5,954,796 A | 9/1999 | McCarty et al. |
| 5,968,152 A | 10/1999 | Staats |
| 5,970,052 A | 10/1999 | Lo et al. |
| 5,987,605 A | 11/1999 | Hill et al. |
| 5,991,842 A | 11/1999 | Takayama |
| 6,009,480 A | 12/1999 | Pleso |
| 6,032,202 A | 2/2000 | Lea et al. |
| 6,032,261 A | 2/2000 | Hulyalkar |
| 6,038,234 A | 3/2000 | LaFollette et al. |
| 6,038,625 A | 3/2000 | Ogino et al. |
| 6,070,187 A | 5/2000 | Subramaniam et al. |
| 6,073,206 A | 6/2000 | Piwonka et al. |
| 6,091,726 A | 7/2000 | Crivellari |
| 6,115,764 A | 9/2000 | Chisholm et al. |
| 6,118,486 A | 9/2000 | Reitmeier |
| 6,122,248 A | 9/2000 | Murakoshi et al. |
| 6,131,129 A | 10/2000 | Ludtke et al. |
| 6,131,134 A | 10/2000 | Huang et al. |
| 6,131,163 A | 10/2000 | Wiegel |
| 6,133,938 A | 10/2000 | James |
| 6,138,163 A | 10/2000 | Nam et al. |
| 6,138,196 A | 10/2000 | Takayama et al. |
| 6,141,702 A | 10/2000 | Ludtke et al. |
| 6,141,767 A | 10/2000 | Hu et al. |
| 6,145,018 A | 11/2000 | LaFollette et al. |
| 6,157,972 A | 12/2000 | Newman et al. |
| 6,160,796 A | 12/2000 | Zou |
| 6,167,532 A | 12/2000 | Wiseccup |
| 6,173,327 B1 | 1/2001 | De Borst et al. |
| 6,178,445 B1 | 1/2001 | Dawkins et al. |
| 6,185,622 B1 | 2/2001 | Sato |
| 6,188,700 B1 | 2/2001 | Kato et al. |
| 6,192,189 B1 | 2/2001 | Fujinami et al. |
| 6,192,397 B1 | 2/2001 | Thompson |
| 6,199,119 B1 | 3/2001 | Duckwall et al. |
| 6,202,210 B1 | 3/2001 | Ludtke |
| 6,212,171 B1 | 4/2001 | LaFollette et al. |
| 6,212,633 B1 | 4/2001 | Levy et al. |
| 6,233,615 B1 | 5/2001 | Van Loo |
| 6,233,624 B1 | 5/2001 | Hyder et al. |
| 6,247,063 B1 | 6/2001 | Ichimi et al. |
| 6,247,083 B1 | 6/2001 | Hake et al. |
| 6,253,114 B1 | 6/2001 | Takihara |
| 6,253,255 B1 | 6/2001 | Hyder et al. |
| 6,260,063 B1 | 7/2001 | Ludtke et al. |
| 6,266,334 B1 | 7/2001 | Duckwall |
| 6,266,344 B1 | 7/2001 | Fujimoro et al. |
| 6,266,701 B1 | 7/2001 | Sridhar et al. |
| 6,275,889 B1 | 8/2001 | Saito |
| 6,282,597 B1 | 8/2001 | Kawamura |
| 6,292,840 B1 | 9/2001 | Blomfield-Brown et al. |
| 6,295,479 B1 | 9/2001 | Shima et al. |
| 6,308,222 B1 | 10/2001 | Krueger et al. |
| 6,311,228 B1 | 10/2001 | Ray |
| 6,314,461 B2 | 11/2001 | Duckwall et al. |
| 6,343,321 B2 | 1/2002 | Patki et al. |
| 6,345,315 B1 | 2/2002 | Mishra |
| 6,347,362 B1 | 2/2002 | Schonias et al. |
| 6,353,868 B1 | 3/2002 | Takayama et al. |
| 6,356,558 B1 | 3/2002 | Hauck et al. |
| 6,363,085 B1 | 3/2002 | Samuels |
| 6,373,821 B2 | 4/2002 | Staats |
| 6,385,679 B1 | 5/2002 | Duckwall et al. |
| 6,405,247 B1 | 6/2002 | Lawande et al. |
| 6,411,628 B1 | 6/2002 | Hauck et al. |
| 6,418,150 B1 | 7/2002 | Staats |
| 6,425,019 B1 | 7/2002 | Tateyama et al. |
| 6,426,062 B1 | 7/2002 | Chopra et al. |
| 6,426,962 B1 | 7/2002 | Cabezas et al. |
| 6,442,630 B1 | 8/2002 | Takayama et al. |
| 6,446,142 B1 | 9/2002 | Shima et al. |
| 6,452,975 B1 | 9/2002 | Hannah |
| 6,457,086 B1 | 9/2002 | Duckwall |
| 6,466,982 B1 | 10/2002 | Ruberg |
| 6,496,862 B1 | 12/2002 | Akatsu et al. |
| 6,519,657 B1 * | 2/2003 | Stone et al. .................. 710/10 |
| 6,529,552 B1 | 3/2003 | Ito et al. |
| 6,529,984 B1 | 3/2003 | Teener et al. |
| 6,587,904 B1 | 7/2003 | Hauck et al. |
| 6,591,300 B1 | 7/2003 | Yurkovic |
| 6,618,750 B1 | 9/2003 | Staats |
| 6,618,785 B1 | 9/2003 | Whitby-Streves |
| 6,628,607 B1 | 9/2003 | Hauck et al. |
| 6,850,486 B2 | 2/2005 | Saleh et al. |
| 6,944,705 B1 | 9/2005 | Whitby-Strevens |
| 2001/0001151 A1 | 5/2001 | Dukwall et al. |
| 2001/0019561 A1 | 9/2001 | Staats |
| 2001/0024423 A1 | 9/2001 | Duckwall et al. |
| 2002/0057655 A1 | 5/2002 | Staats |
| 2002/0085581 A1 | 7/2002 | Hauck et al. |
| 2002/0101231 A1 | 8/2002 | Staats |
| 2002/0103947 A1 | 8/2002 | Duckwall et al. |
| 2002/0188780 A1 | 12/2002 | Duckwall |
| 2002/0188783 A1 | 12/2002 | Duckwall et al. |
| 2003/0037161 A1 | 2/2003 | Duckwall et al. |
| 2003/0055999 A1 | 3/2003 | Duckwall et al. |
| 2003/0056672 A1 * | 3/2003 | Ueda et al. .................. 101/483 |
| 2005/0021873 A1 | 1/2005 | Papadimitriou et al. |

2006/0020729 A1* 1/2006 Nakamura et al. .......... 710/113

FOREIGN PATENT DOCUMENTS

EP            1 085 706 A3    10/2002

OTHER PUBLICATIONS

"IEEE Standard for a High Performance Serial Bus", IEEE Standard 1394-1995, Institute of Electrical and Electronics Engineers, Inc., Aug. 30, 1996.

"IEEE Standard for a High Performance Serial Bus-Amendment 1", Institute of Electrical and Electronics Engineers, Inc., pp. 1-196, 2000 (no month).

P1394b IEEE Draft Standard for a High Performance Serial Bus (High Speed Supplement), Institute of Electrical and Electronics Engineers, Inc., pp. 1-408, 2002 (no month).

"AV/C Digital Interface Command Set General Specification, Rev. 3.0", 1394 Trade Association, pp. 4-5, 20-34, Apr. 15, 1998.

"Enhancements to the AV/C General Specification 3.0 Version 1.0FCI", 1394 Trade Association, pp. 4, 6-17, Nov. 5, 1998.

"Fibre Channel-Methodologies for Jitter Specification", NCITS TR-25-1999, Jitter Working Group Technical Report, Rev. 10, pp. 1-96, Jun. 9, 1999.

Bregni et al., Jitter Testing Technique and Results at VC-4 Desynchronizer Output of SDH Equipment, IEEE International Conference on Communications, vol. 3, pp. 1407-1410, May 12, 1994.

"Information Technology—Microprocessor Systems-Control and Status Registers (CSR) Architecture for Microcomputer Buses", [ANSI/IEEE Std. 1212, 1994 Ed.], The Institute of Electrical and Electronics Engineers, inc., pp. 1-122, Oct. 5, 1994.

Bregni et al., Jitter Testing Technique and Results at VC-4 Desynchronizer Output of SDH Equipment, IEEE Transactions on Instrumentation and Measurement, vol. 44, Issue 3, pp. 675-678, Jun. 1995.

Shiwen et al., "Parallel Positive Justification in SDH C-4 Mapping", IEEE International Conference on Communications, vol. 3, pp. 1577-1581, Jun. 12, 1997.

"Information Technology-Fibre Channel-Methodologies for Jitter Specification", NCITS Technical Report (NCITS TR-25-1999, REV. 10), pp. 1-96, Jun. 9, 1999.

* cited by examiner

Alpha Format Packet

Legacy Compatibility Example

Legacy Speed Filtering Example

P1394b Packet Format

Data Communications System Having both
P1394b and Legacy Devices

Detection and Communication of Hybrid Bus
According to the Present Invention

Legacy Format Packet

Detection and Communication of a Legacy Link Layer
According to the Present Invention Detection and Communication of Hybrid Bus
According to the Present Invention Detection of Path to Senior Border
By a Border PHY
According to the Present Invention Identification of Senior Border Node
By a B PHY
According to the Present Invention Restoring Senior Border as BOSS
According to the Present Invention OK_TO_GRANT Profile
According to the Present Invention

METHOD AND APPARATUS FOR BORDER NODE BEHAVIOR ON A FULL-DUPLEX BUS

This application is a divisional of and claims priority to co-owned U.S. patent application Ser. No. 10/635,835 filed Aug. 5, 2003 and entitled "METHOD AND APPARATUS FOR BORDER NODE BEHAVIOR ON A FULL-DUPLEX BUS", now U.S. Pat. No. 7,266,617, which is a continuation of co-owned U.S. patent application Ser. No. 09/484,479 filed Jan. 18, 2000 and entitled "METHOD AND APPARATUS FOR BORDER NODE BEHAVIOR ON A FULL-DUPLEX BUS", now U.S. Pat. No. 6,639,918, each of the foregoing incorporated into the present application by reference in its entirety.

This application is also related to co-owned U.S. Pat. application Ser. No. 10/635,706 filed Aug. 5, 2003 and entitled "METHOD AND APPARATUS FOR BORDER NODE BEHAVIOR ON A FULL-DUPLEX BUS", now U.S. Pat. No. 7,317,694; U.S. patent application Ser. No. 10/635,834 filed Aug. 5, 2003 and entitled "METHOD AND APPARATUS FOR BORDER NODE BEHAVIOR ON A FULL-DUPLEX BUS", now U.S. Pat. No. 6,891,848; U.S. patent application Ser. No. 10/635,749 filed Aug. 5, 2003 and entitled "METHOD AND APPARATUS FOR BORDER NODE BEHAVIOR ON A FULL-DUPLEX BUS", now U.S. Pat. No. 7,280,490; U.S. patent application Ser. No. 10/635,836 filed Aug. 5, 2003 and entitled "METHOD AND APPARATUS FOR BORDER NODE BEHAVIOR ON A FULL-DUPLEX BUS", now U.S. Pat. No. 7,280,491; U.S. patent application Ser. No. 10/635,593 filed Aug. 5, 2003 and entitled "METHOD AND APPARATUS FOR BORDER NODE BEHAVIOR ON A FULL-DUPLEX BUS", now U.S. Pat. No. 7,352,708; U.S. patent application Ser. No. 10/741,782 filed Aug. 5, 2003 and entitled "METHOD AND APPARATUS FOR BORDER NODE BEHAVIOR ON A FULL-DUPLEX BUS", now abandoned; and U.S. patent application Ser. No. 11/895,871 filed Aug. 27, 2007, each of the foregoing incorporated into the present application by reference in its entirety.

BACKGROUND OF THE INVENTION

1. Field of the Invention

The present invention relates to bus management. In particular, the present invention relates to the behavior of border nodes within a high performance serial bus system.

2. The Prior Art

Background

Modern electronic equipment has greatly enhanced the quality of our lives. However, as the use of such equipment has increased, so has the need to connect equipment purchased from different manufacturers. For example, while a computer and a digital camera may each be useful when used alone, the ability to connect the digital camera to the computer and exchange information between the two makes the combination even more useful. Therefore, a need was apparent for a serial bus standard that would allow for the connection and communication between such devices.

The IEEE 1394-1995 standard was developed to satisfy this need. This standard revolutionized the consumer electronics industry by providing a serial bus management system that featured high speeds and the ability to "hot" connect equipment to the bus; that is, the ability to connect equipment without first turning off the existing connected equipment. Since its adoption, the IEEE 1394-1995 standard has begun to see acceptance in the marketplace with many major electronics and computer manufacturers providing IEEE 1394-1995 connections on equipment that they sell.

However, as technologies improved, the need to update the IEEE 1394-1995 standard became apparent. Two new standards are being proposed at the time of the filing of this application, herein referred to as the proposed IEEE 1394a, or P1394a standard, and the proposed IEEE 1394b, or P1394b standard. Improvements such as higher speeds and longer connection paths will be provided.

In the discussion that follows, it will be necessary to distinguish between the various standards that are being proposed as of the date of this application. Additionally, it will be necessary to distinguish hardware and packet transmissions that are compatible with the P1394b standard and not earlier standards.

Thus, the term "Legacy" will be used herein to refer to the IEEE 1394-1995 standard and all supplements thereof prior to the P1394b standard. Thus, for example, a Legacy node refers to a node compatible with the IEEE 1394-1995 standard and all supplements thereof up to, but not including, the P1394b standard.

Additionally, packets of data will be referred to herein depending on the context the packets are in. For example, a packet of data that is compatible with the P1394b standard and is travelling through a PHY compatible with the P1394b standard will be referred to as Beta format packets. Packets of data that are compatible with the Legacy standard but are travelling through a PHY compatible with the P1394b standard will be referred to as Legacy format packets. Finally, packets of data that are compatible with the Legacy format and are travelling across a data strobe link will be referred to as Alpha format packets.

Furthermore, in the discussion that follows PHYs that are compatible with the P1394b standard may be referred to in various ways, depending upon the context the PHY is operating in and the capability of the PHY. For example, a PHY that has circuitry compatible with the P1394b standard but not any previous standards will be referred to as a B only PHY. Also, a PHY that is compatible with the P1394b standard and is directly attached with only devices compatible with the P1394b standard will be referred to as B PHYs. Finally, a PHY that is communicating with both Legacy devices and devices compatible with the P1394b standard will be referred to as a border device, border PHY, or border node.

Finally, a communications systems that has only B PHYs attached will be referred to as a B bus.

Data Transmission in Legacy Systems

One area that has been improved in the P1394b standard is in the way that data transmission takes place on the bus.

FIG. 1 is a prior art example of a Alpha format data packet 100 according to Legacy specifications. In the Legacy specifications, a data packet will begin with the transmission of a Data Prefix ("DP") identifier, shown as DP 102 in FIG. 1. Importantly, in the Legacy specification, a DP must have a duration of no less than 140 nanoseconds (ns), though a DP may be of any greater length.

Typically, a DP is followed by the transmission of clocked data, known as the payload, shown as clocked data 104 in FIG. 1. On a Legacy bus, the payload will be clocked at a rate of 100 Megabits per second (Mb/s), 200 Mb/s, or 400 Mb/s. These data rates are known as S100, S200, and S400, respectively.

Finally, the payload is followed by a Data End ("DE"), shown as DE 106 in FIG. 1. In the Legacy specifications, a DE must be at least 240 ns in length.

As is appreciated by one of ordinary skill in the art, the Legacy specifications thus define a timer-based system, where data transmission begins and ends according to a fixed timer.

Compatibility Issues in Legacy Systems

As mentioned above, there are three clocked data rates present in Legacy systems, S100, S200, and S400. Initially, when the IEEE 1394-1995 standard was introduced, devices could only communicate at the S100 rate. Later, devices were introduced that communicated at the S200 and S400 rates.

One problem that occurred in the prior art was how to insure compatibility between the various devices on the market that were communicating at these different rates.

Figure 2:
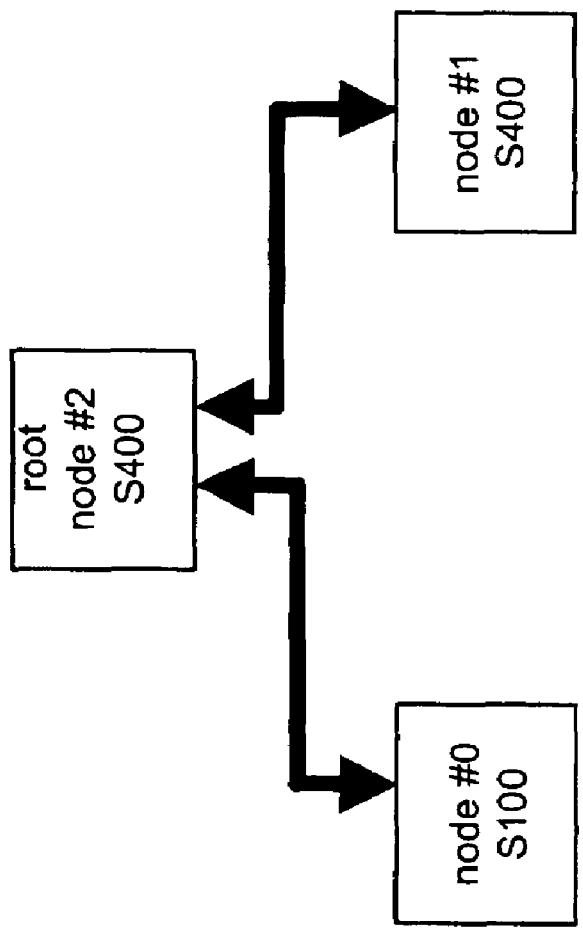

FIG. 2 illustrates such a compatibility problem. FIG. 2 has three nodes, nodes #0, #1, and #2. Node #2, the root node in this example, wishes to communicate with node #1. As is indicated in FIG. 2, nodes #1 and #2 are capable of communicating at the S400 data rate, while node #0 is only capable of communication at the lower S100 rate.

Figure 3:
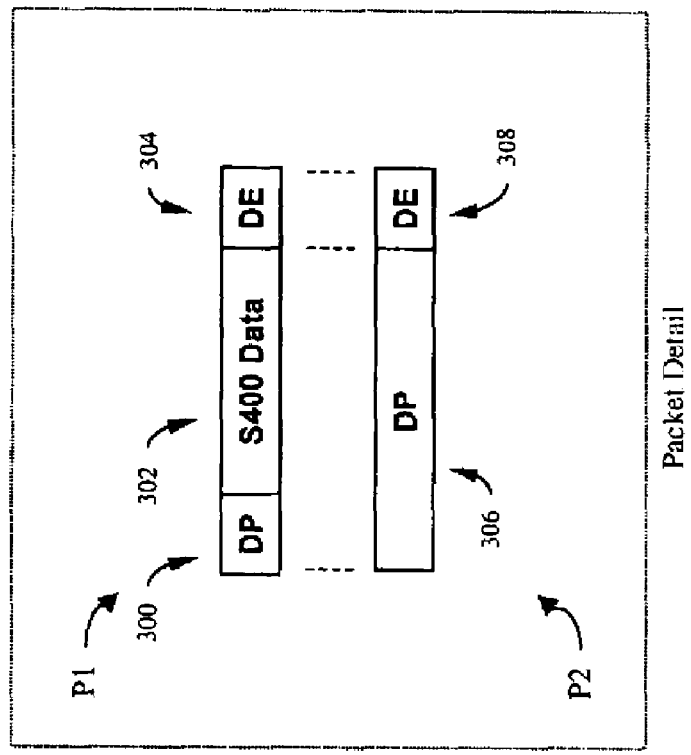
Figure 3:
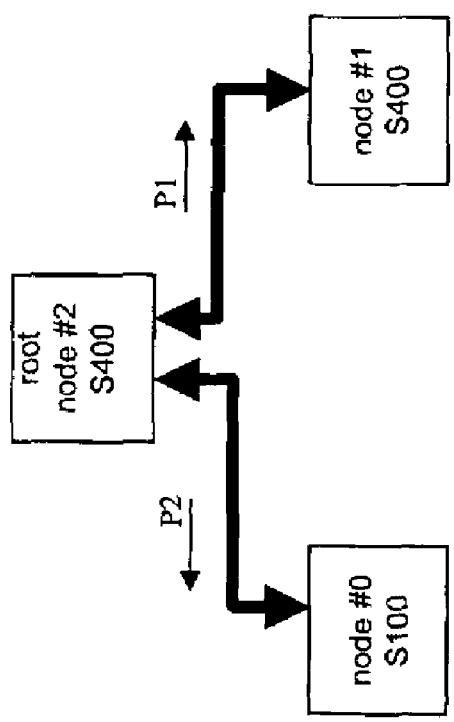

FIG. 3 illustrates the prior art solution of speed filtering on a Legacy bus. FIG. 3 shows root node #2 transmitting S400 data in packet P1 to node #1. In the prior art, to prevent node #0 from receiving the S400 data that it cannot understand, it is "shielded" from such data by having root node #2 transmit a null packet P2 to it.

In the FIG. 3 Packet Detail illustration, packets P1 and P2 are shown together on a common time axis. Packet P1 comprises a DP 300, S400 data 302, and a DE 304. Null packet P2 comprises a DP 306, and a DE 308. As is appreciated by one of ordinary skill in the art, the null packet accomplishes its shielding by extending the DP for the amount of time required to send S400 data 302. As is known by those of ordinary skill in the art, on a Legacy bus all nodes must remain synchronized in their interpretation of idle time. Thus, the null packet effectively 'busies' node #0 while root node #2 transmits S400 data to node #1 and thus shields node #0 from speeds it cannot understand.

Data Transmission in P1394b

Figure 4:
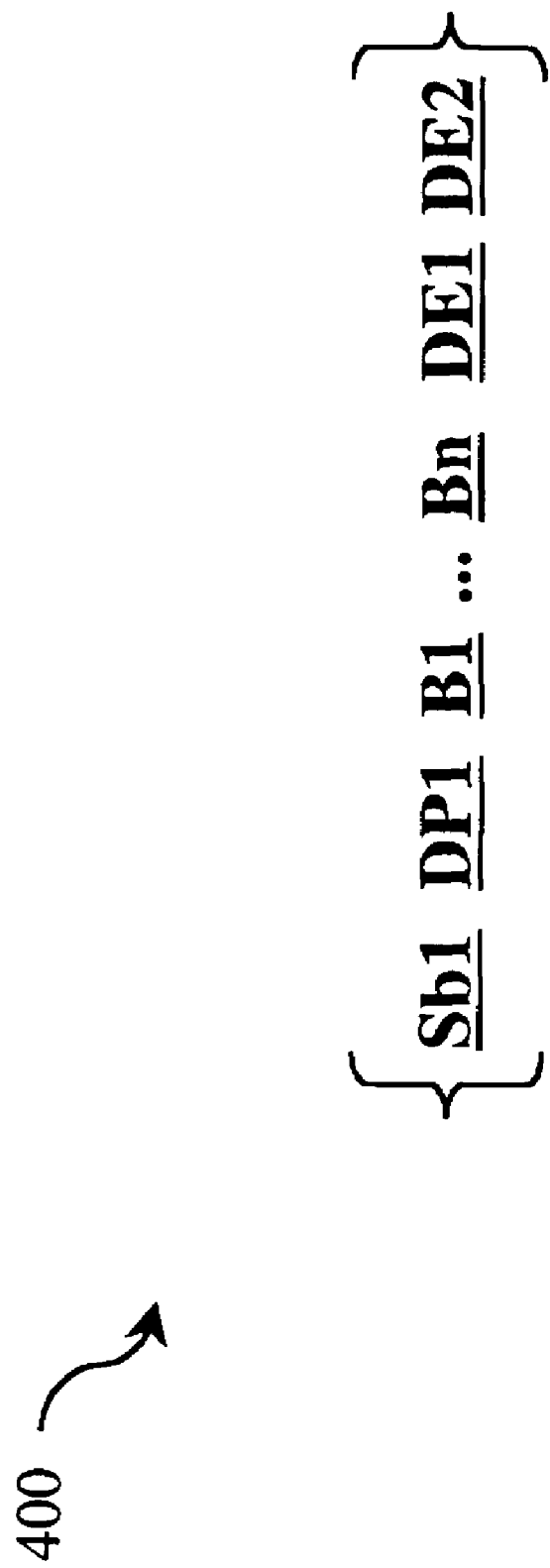

FIG. 4 is a representation of the prior art data packet structure according to the P1394b standard. As is known by those of ordinary skill in the art, P1394b utilizes a packet structure that is scaled to speed unlike the fixed timer system utilized in Legacy standards. Specifically, the packet structure in P1394b is based upon symbols, rather than the fixed intervals found in the Legacy standards.

In FIG. 4, a typical prior art packet 400 of P1394b data is shown. As is known by those of ordinary skill in the art, a data packet begins in P1394b with the transmission of at least two packet starting symbols. In this example, a Speed Code symbol Sb1 and a Data Prefix symbol DP1 are shown as the packet starting symbols. Then, P1394b data bytes B1 through Bn are transmitted. Bytes B1 through Bn may be referred to herein as the payload. Finally, the transmission of data is terminated by transmitting DE symbols DE1 and DE2.

Compatibility Problems Between P1394b and Legacy Nodes and Clouds

Figure 5:
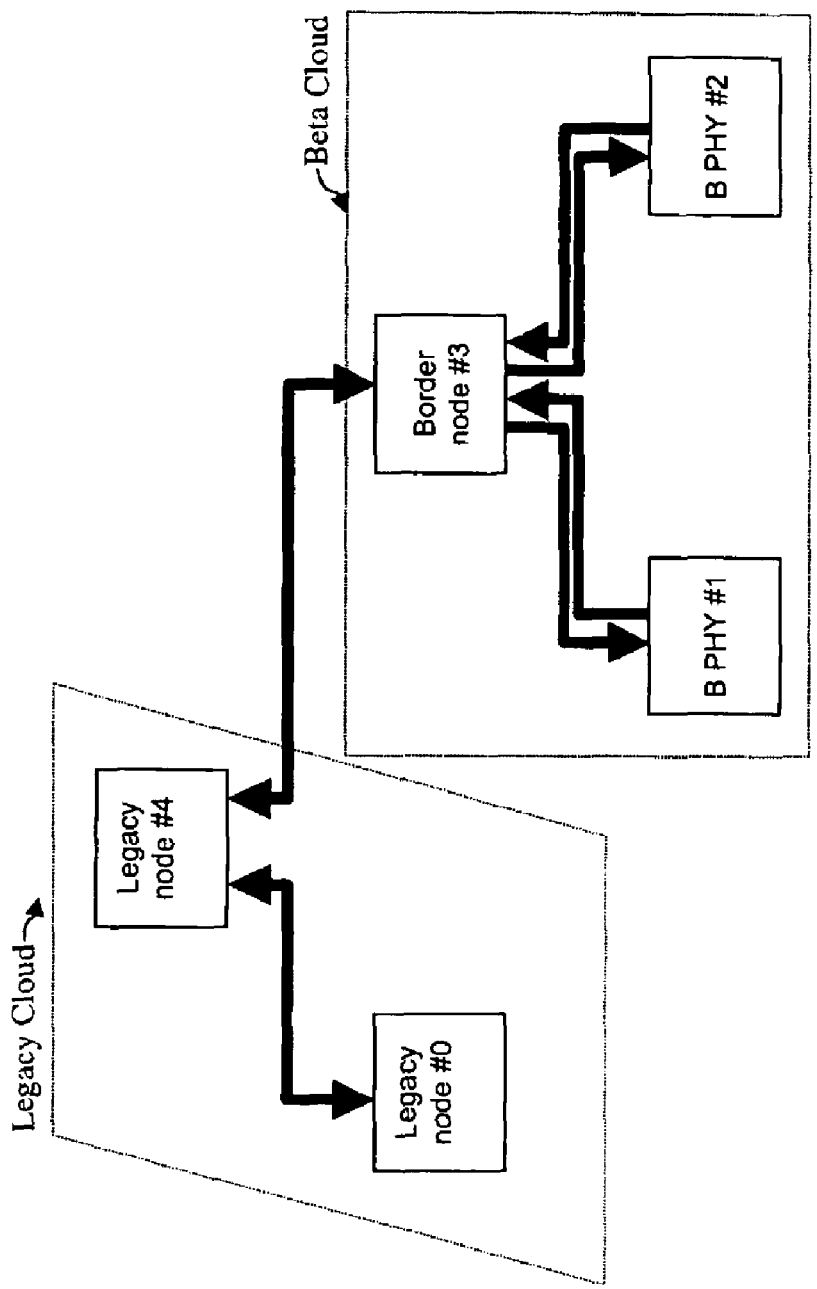

FIG. 5 shows a data communications system comprising both P1394b and Legacy devices. This type of system will be referred to herein as a "hybrid" system. FIG. 5 shows a Legacy node #0 connected to Legacy node #4, forming what is known as an "Legacy cloud" of Legacy nodes.

Legacy node #4 is connected to border node #3. Border node #3 is connected to B PHYs #1 and #2, forming what is known as a "Beta cloud" of border and B PHYs.

One problem encountered with systems containing both Legacy and P1394b compliant nodes is how to ensure that the newer P1394b PHYs know that there are older Legacy devices present on the bus. Hence there is a need for a method to determine the existence of a hybrid bus such as that of FIG. 5.

Furthermore, given a hybrid bus, there is a need to establish one border node as the senior border node within a given cloud. Furthermore, given a hybrid system with many clouds, there is a need to establish one border node from each cloud as a senior border node.

Another problem raised by the configuration of FIG. 5 is that of arbitration on a hybrid bus. As is known by those of ordinary skill in the art, the Legacy standard employs a single request type for both asynchronous and isochronous arbitration. The first request to be received by the root is granted immediately, and all other requests are denied and required to be withdrawn. P1394b, however, uses a pipelined arbitration system, pipelining requests for both the asynchronous and isochronous bus phases. Thus the BOSS node, which is responsible for granting arbitration requests in P1394b, nominally must be aware of the phase of the bus in order to properly grant arbitration requests.

However, there may be a case where the BOSS node is unaware of when the bus enters into an isochronous phase. For example, this may happen when there are no isochronous-aware nodes within the Beta cloud that the BOSS is in, while a Legacy cloud is introducing an isochronous request into the Beta cloud. In these cases, the nodes in the Beta cloud will continue to assume that the phase of the bus is asynchronous, and the grant for the Legacy isochronous request may be handled incorrectly. Therefore, there is a need for an arbitration protocol for properly handling arbitration requests throughout multiple clouds.

Another problem raised by the configuration shown in FIG. 5 is that of managing the timers required by the Legacy standard. As mentioned above, the Legacy standard requires that bus protocols occur according to a gap timer-based system, whereas the P1394b standard abandons the timers in favor of a symbol-based system.

Border devices already contain the necessary logic to manage gap timers, since by definition border nodes have Legacy compatible ports. However, B only devices do not contain the circuitry necessary to manage timers according to the Legacy standard. Therefore, there is a need for a protocol for freeing B only devices of the gap timer requirements and transferring this responsibility to border nodes, thus freeing B only devices from the requirement of having gap timer logic built in.

Another issue raised by the hybrid system shown in FIG. 5 is what happens if the bus fails. As is known by those of ordinary skill in the art, occasionally an acknowledge or a grant can be lost in the system, throwing the system into a "race" state, whereby no device is in charge of the system. In other words, a condition can occur where no device knows the current state of the system. Currently, there exists no protocol for a hybrid bus to prevent or cure race conditions. Hence, there is a need for a protocol to allow a hybrid bus to return to a known state.

A final issue concerning the system of FIG. 5 is related to what is known as "quiet times" in the Legacy standard. As is known by those of ordinary skill in the art, in order to arbitrate for control of the bus, a Legacy node must sometimes wait for a subaction or arbitration reset gap to occur. However, in order to ensure that all nodes on the bus see the same subaction or arbitration reset-gap, hysteresis is built into the process by making a node wait an additional period known as an "arb- _delay" before arbitrating. This arb_delay guarantees that in a worst case round-trip scenario across the bus, every node has seen the subaction gap or the arbitration gap. The period comprising the subaction gap plus the arb_delay is known as quiet time #1, and the period comprising the arbitration reset gap plus the arb_delay is known as quiet time #2, and no arbitration requests may be made during either quiet time.

There is a danger in a hybrid bus of a B PHY granting requests during this quiet time. Currently, there is no protocol for insuring that B PHYs do not interfere with Legacy arbitration timing schemes, other than forcing B PHYs to adhere to Legacy standards, which is undesirable since the performance gains inherent in the P1394b standard are lost. Hence, there is a need for a protocol that allows the coexistence of Legacy and P1394b arbitration in a hybrid bus.

BRIEF DESCRIPTION OF THE INVENTION

The invention satisfies the above needs. The present invention relates to bus management. In particular, the present invention relates to the behavior of border nodes within a high performance serial bus system.

A method for determining and communicating the existence of a hybrid bus is disclosed, comprising the acts of: determining whether the node is a border node; forwarding isochronous and asynchronous requests as normal if the node is not a border node; and if the node is a border node, then; determining whether the node has any asynchronous requests to forward; issuing a Border_low request if there are no asynchronous requests to forward; forwarding the asynchronous requests if there are asynchronous requests to forward; determining whether there are any isochronous requests to forward; issuing a Border_low request if there are no isochronous requests to forward; and forwarding the isochronous requests if there are isochronous requests to forward.

BRIEF DESCRIPTION OF THE DRAWING FIGURES

Figure 6:
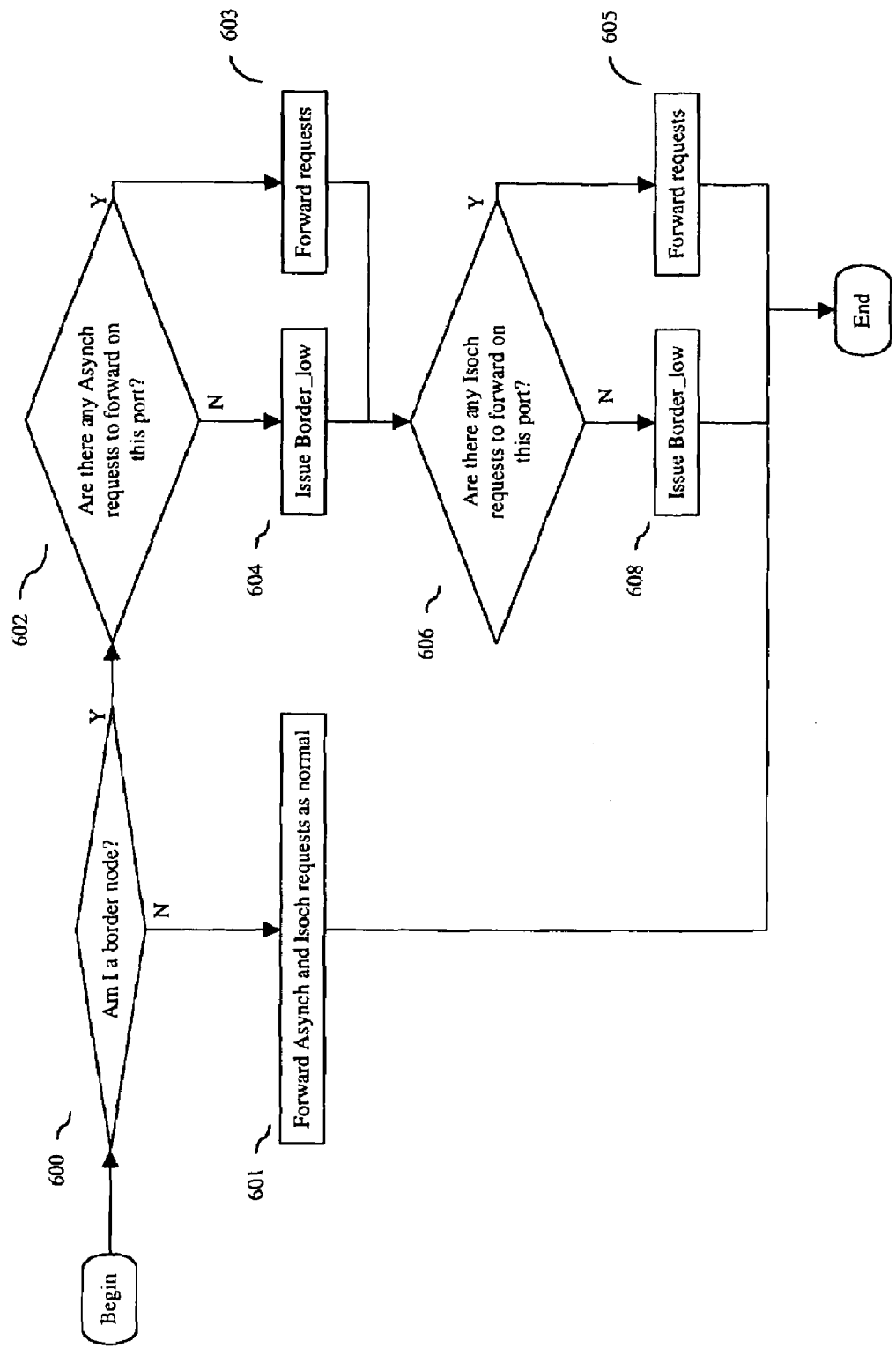
Figure 7:
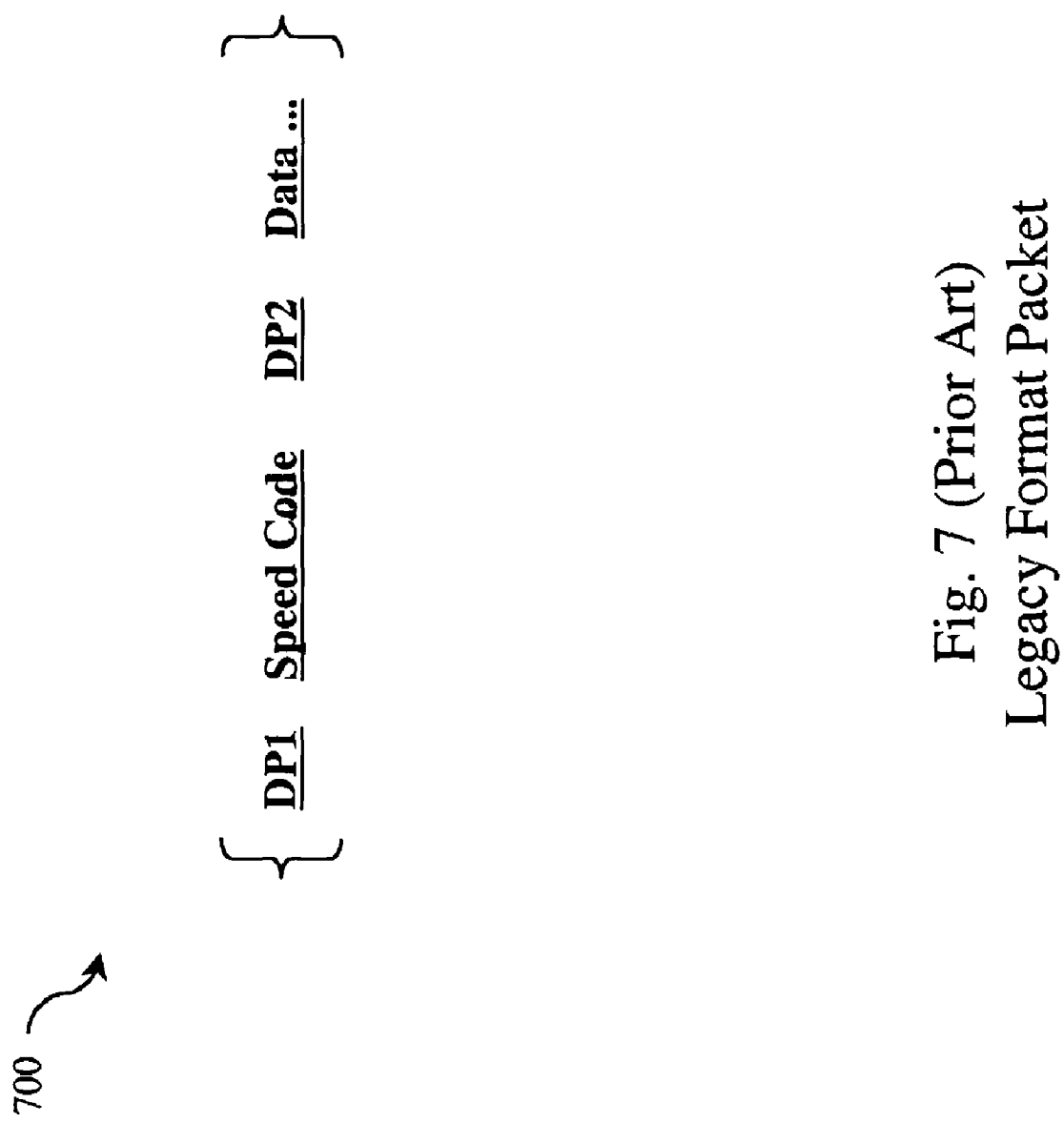
Figure 8:
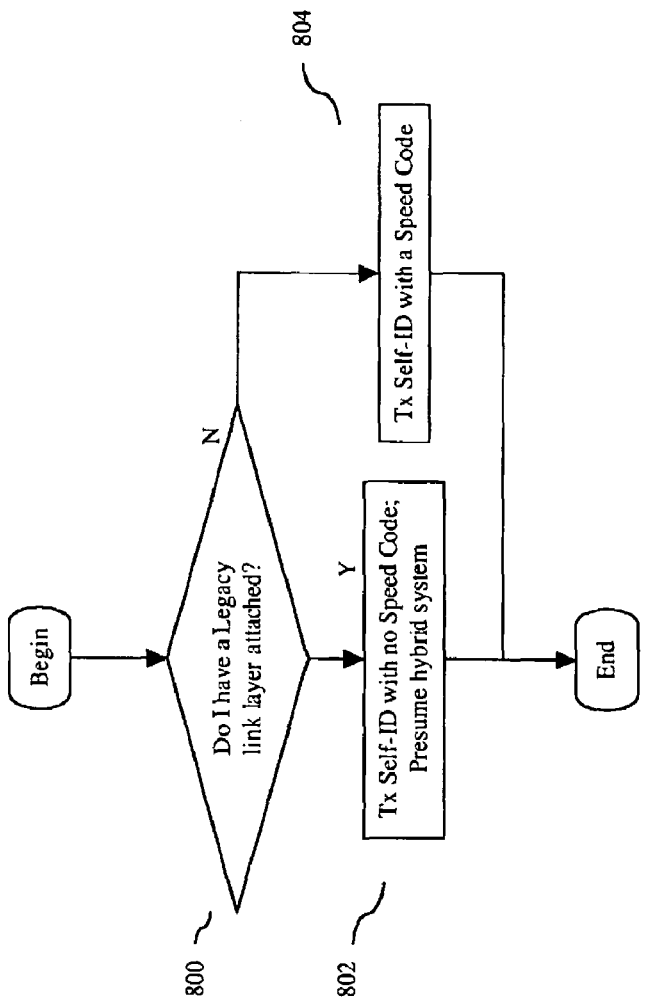
Figure 9:
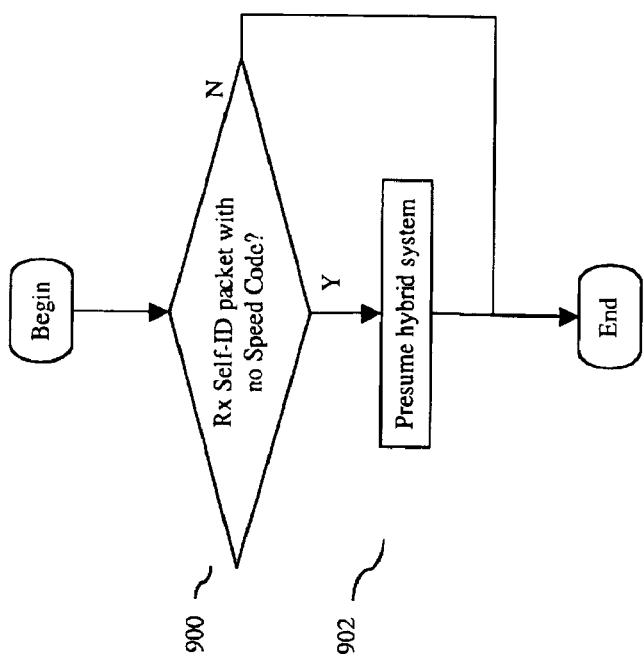
Figure 10:
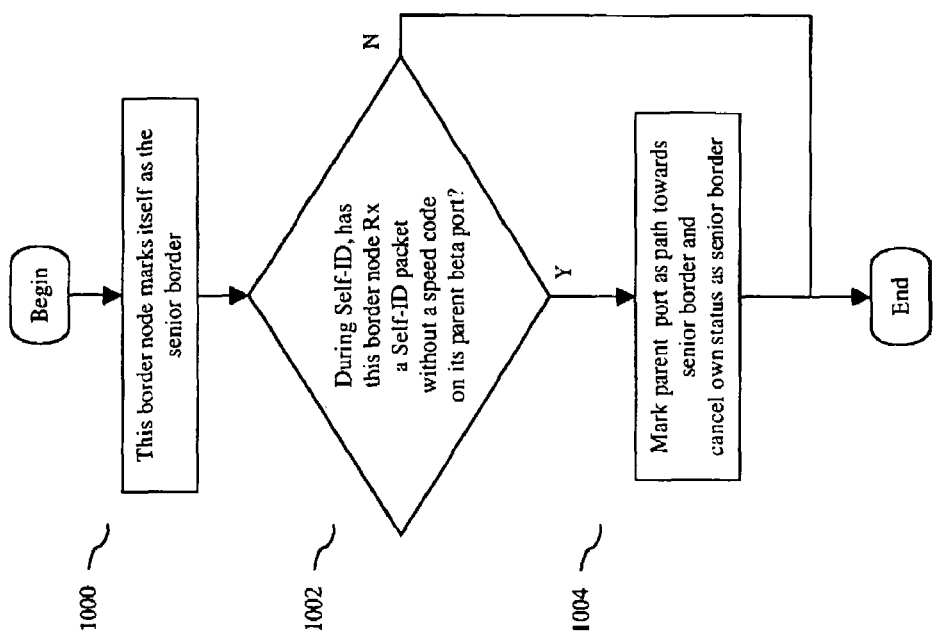
Figure 11:
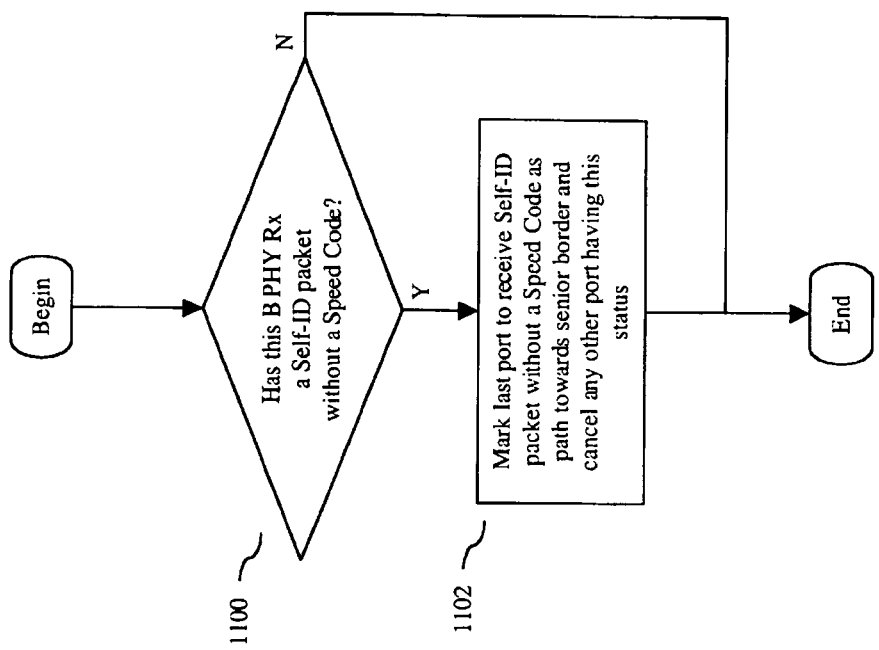
Figure 12:
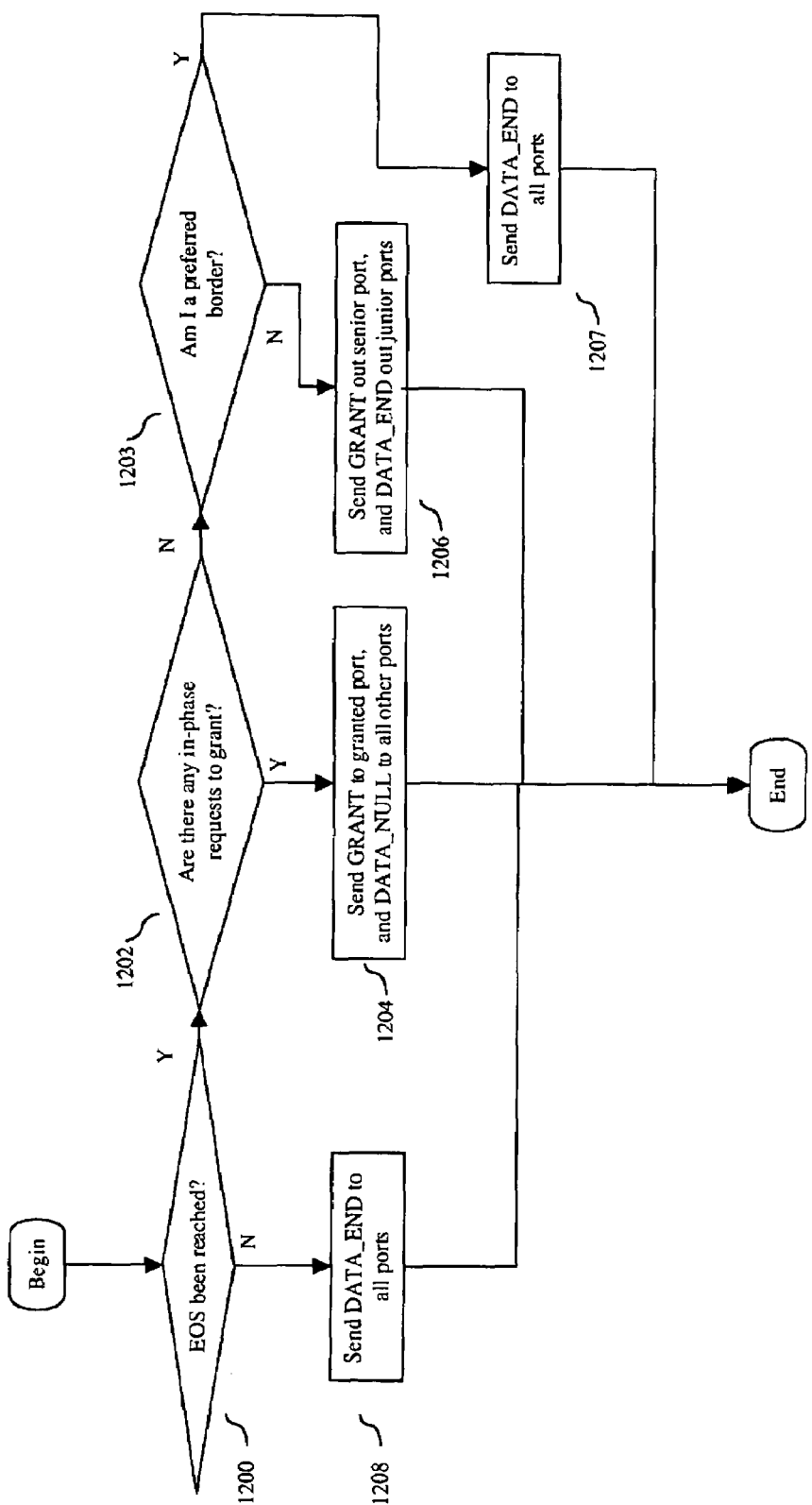
Figure 13:
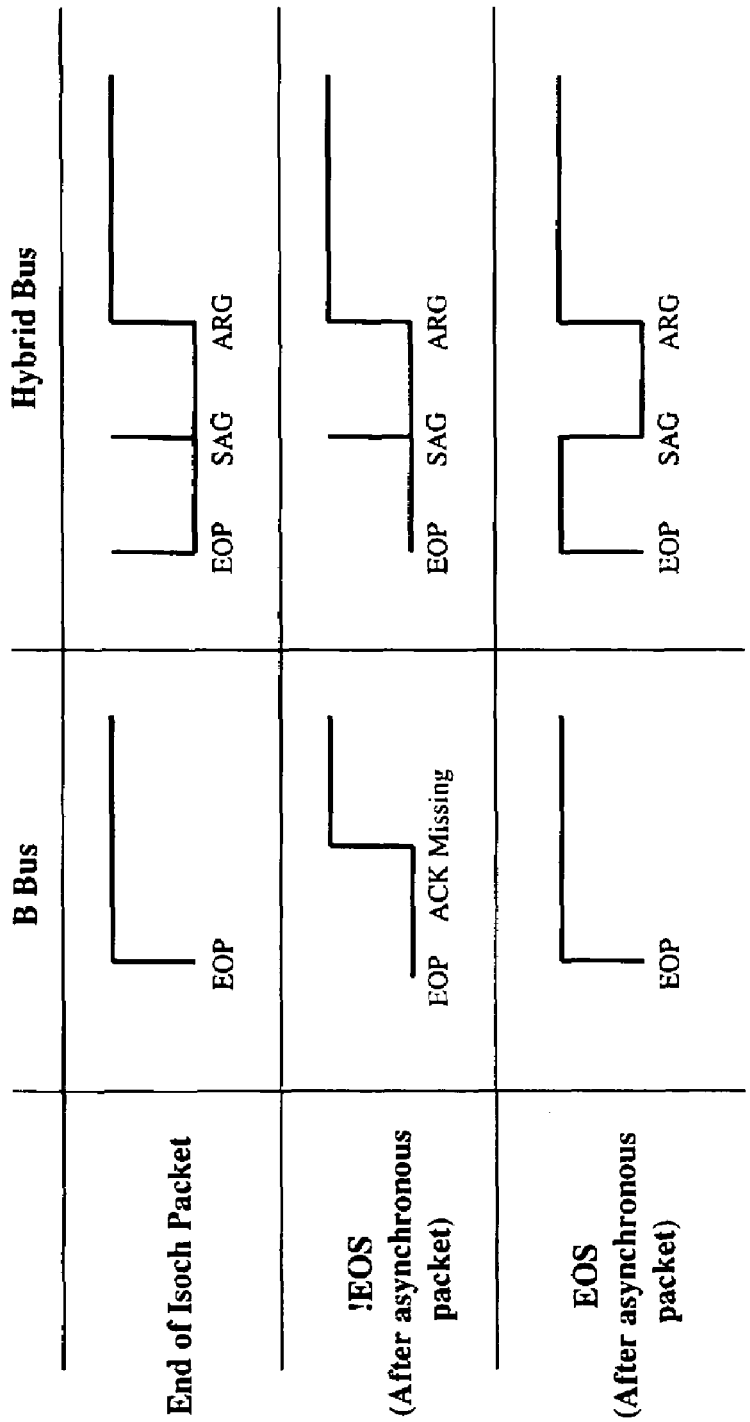

FIG. 1 is a prior art Alpha Format Packet example.
FIG. 2 is a prior art Legacy Compatibility example.
FIG. 3 is a prior art Legacy Speed Filtering example.
FIG. 4 is a prior art P1394b Packet format example.
FIG. 5 is a prior art Data Communications System having both P1394b and Legacy devices.
FIG. 6 is a Flowchart For Detection And Communication Of Hybrid bus According To The Present Invention.
FIG. 7 is a prior art Legacy Format Packet.
FIG. 8 is a Flowchart For Detection And Communication Of A Legacy Link Layer According To The Present Invention.
FIG. 9 is a Flowchart For Detection And Communication Of A Hybrid Bus According To The Present Invention.
FIG. 10 is a flowchart for Detection of Path to Senior Border By a Border PHY According to the Present Invention.
FIG. 11 is a flowchart for Identification of Senior Border Node By a B PHY According to the Present Invention.
FIG. 12 is a flowchart for Restoring Senior Border Node as BOSS According to the Present Invention.
FIG. 13 is a flowchart for an OK_TO_GRANT Profile According to the Present Invention.

DETAILED DESCRIPTION OF PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

The present invention relates to data communications. More particularly, the present invention relates to a method and apparatus for an arbitration and fairness protocol on a serial bus. The invention further relates to machine readable media on which are stored embodiments of the present invention. It is contemplated that any media suitable for retrieving instructions is within the scope of the present invention. By way of example, such media may take the form of magnetic, optical, or semiconductor media.

The present invention relates to data structures and the transmission of such data structures. It is contemplated that the present invention may by embodied in various computer and machine readable data structure. Furthermore, it is contemplated that data structures embodying the present invention will be transmitted across computer and machine readable media.

The present invention may be described through the use of flowcharts. Often, a single instance of an embodiment of the present invention will be shown. As is appreciated by those of ordinary skill in the art, however, the protocols and procedures described herein may be repeated continuously or as often as necessary to satisfy the needs described herein. Accordingly, the representation of the present invention through the use of flowcharts should not be used to limit the scope of the present invention.

The present invention further relates to devices that embody the P1394b standard. By way of example, such devices may include those typically used in an audio/video entertainment system, such as home theater receivers, DVD players, computers, or hand-held devices such as cameras and the like. The devices may also include those industrial in nature, such as test and measurement equipment, professional audio/video recording devices, as well as system control or robotic devices found in an industrial environment.

The invention also relates to nodes and physical computers, such as state machines. The present invention may be embodied in any collection of nodes linked together through a bus. Typically, each device connected to the bus will also have one corresponding node physical layer controller embedded therein. However, a given device may have more than one node, and therefore it follows that one device may have more than one connection to more than one bus. For the discussion that follows, the examples will show the typical situation were one node corresponds to one device.

Each node may communicate to other nodes in an P1394b-compatible system though links. Typically, a cable is used for a link, as is provided for in the P1394b standard. However, any communication means may be employed. By way of example, an infrared, RF, or other wireless system may be used, as well as an optical system.

Typically, a link is coupled to a node through a port. A port transmits and receives messages and data between the node and link. As is known by those of ordinary skill in the art, each node may have more than one port.

Detecting the Presence of a Hybrid Bus

As mentioned in the prior art discussion above, one problem associated with the prior art was the need for a method of identifying a hybrid bus. Two methods according to the present invention for detecting a hybrid bus will now be disclosed.

Detection through the use of P1394b Request Symbols

A first preferred embodiment takes advantage of certain characteristics inherent in the P1394b standard to detect the presence of a Legacy device or a Legacy link layer. As is known by those of ordinary skill in the art, when a P1394b PHY device is connected to a bus, the P1394b PHY will cycle through certain start-up procedures, known as the "up-start" procedure. One of the by-products of the up-start procedure is that a P1394b PHY will have knowledge of all of the connections that have been made to its ports when the up-start procedure is finished. As a result, at the conclusion of the up-start procedure, if a node has both Legacy and P1394b connections, it will know that is a border node.

As is known by those of ordinary skill in the art, arbitration in the P1394b standard occurs through the use of requests that are pipelined to the BOSS node according to priorities. Furthermore, the protocols in P1394b provide that a node will forward the highest priority request it hears on to the BOSS node. In order to communicate knowledge of the existence of a hybrid bus to the rest of the bus, a special symbol known as Border_low was developed.

FIG. 6 shows the detection and communication of a hybrid bus according to the present invention. In query 600, a node first determines whether or not it is a border node. This detection may occur in any manner, such as the up-start procedure described above.

If the node is not a border node, then in act 601 the node will forward any asynchronous and isochronous requests present as normal, and the process ends.

If the node is a border node, then in query 602 the node next determines whether there are any asynchronous requests to forward on this port. If there are asynchronous requests pending, the node will drain those requests as shown in act 603. If there are no asynchronous requests to forward, then the node will issue a Border_low request as shown in act 604.

Next, in query 606, the node determines whether there are any isochronous requests to forward on this port. If there are isochronous requests pending, the node will forward those requests as shown in act 605. If there are no isochronous requests to forward, then the node will issue a Border_low request as shown in act 608.

In a preferred embodiment of the present invention, the Border_low request is given a low enough priority to allow normal arbitration to take place first. Then, when there are no other in-phase arbitration requests pipelined, all other nodes will forward the Border_low request towards the BOSS node, thus communicating to the BOSS node and those nodes along the path towards the BOSS node that there is a Legacy device on the bus.

In another preferred embodiment of the present invention, there are separate Border_low request symbols for both the asynchronous and isochronous arbitration phases.

In one embodiment, the Border_low request has been encoded within data packets transmitted on a P1394b-compliant bus. In another embodiment, the Border_low request has been programmed and encoded in logic on a PHY.

Detection of a Hybrid Bus through the use of the Self-ID Sequence

As is known by those of ordinary skill in the art, when a node initializes there is a Self-ID stage wherein each node transmits its identity and certain characteristics about itself to the rest of the bus. As is further known by those of ordinary skill in the art, when a node transmits a packet on a bus, there is a speed code contained therein that identifies the clock rate of the data being transmitted. The S100 Alpha format packet contains no speed code, and thus no speed code is repeated into the Beta cloud. The present invention utilizes both of these characteristics.

FIG. 7 shows an example of the beginning of a prior art Legacy packet format. Within packet 700, there is first a data prefix DP1 and a Speed Code symbol. As is known by those of ordinary skill in the art, the Speed Code symbol will contain an indication therein of the clock rate of the data that will follow DP2 in packet 700.

FIG. 8 is a flowchart of detection and communication of a Legacy link layer according to the present invention. In query 800, the PHY will determine if has a Legacy link layer attached to it. If the node determines that it has a Legacy link layer attached, then it will transmit a Self-ID on the bus that has no Speed Code and presume a hybrid system as shown in act 802. If the node determines that it does not have a Legacy link layer attached, then it will transmit a Self-ID on the bus with a Speed Code in act 804.

FIG. 9 is a flowchart of the detection and communication of a hybrid bus according to the present invention. In query 900, all P1394b PHYs will examine each Self-ID that it receives, and will look for the absence of a Speed Code. If there is no Speed Code in a received Self-ID packet, then in act 902, the node will presume that the Self-ID packet passed through a Legacy link some where in the chain, or that a Legacy link layer is present, thus indicating a hybrid bus. In a preferred embodiment, the node will store this presumption until the next bus reset.

In one embodiment of the present invention, this storing is accomplished by way of setting a designated bit within logic in the PHY. In another embodiment of the present invention, this storing is accomplished through the use of a variable in which the state of the bus is stored.

Establishing a Senior Border Node

As mentioned in the prior art section above, there is a need to establish a senior border node among border nodes in one or more clouds. The following discussion discloses a method for determining the path to, and the identification of, a senior border node.

As is known by those of ordinary skill in the art, nodes assign themselves a number, known as a physical ID or a PHY-ID, during the Self-ID process with the lowest numbers being assigned first. It is contemplated that the process according to the present invention may take place at any time after a bus reset and before the completion of the Self-ID process.

FIG. 10 is a flowchart of the detection of the path to the senior border node by a border PHY according to the present invention.

As is known by those of ordinary skill in the art, in the Self-ID process a node will first receive Self-ID packets from its children, if any. The node will then generate its own Self-ID packet. Then, the node will receive Self-ID packets from its parent port.

The following process describes how a particular border node will detect the path to the senior border.

In act 1000, the border node will mark itself as the senior border node. It is contemplated that this act takes place any time after bus reset. In query 1002, the border node will then determine whether it has received a packet on its parent beta port that does not contain a Speed Code during the Self-ID process. It is contemplated that the detection may take place through different methods. By way of example, in one preferred embodiment of the present invention, all of the received Self-ID packets are stored in a queue and the detection for the absence of a Speed Code is performed on all received packets at once. In another preferred embodiment of the present invention, the detection for the absence of a Speed Code takes place at the time each Self-ID packet is received.

If the border node has received a packet on its parent beta port that does not contain a Speed Code during the Self-ID process, then the node marks its parent port as path towards senior node and cancels its own status as senior border node in act 1004. If the border node fails to receive a packet on its parent beta port that does not contain a Speed Code during the Self-ID process, then the process ends.

In one embodiment of the present invention, this marking is accomplished by way of setting a designated bit within logic in the PHY. In another embodiment of the present invention, this marking is accomplished through the use of a variable in which the location of, or the path to, the senior border node is stored.

FIG. 11 shows the identification of the path to the senior border node by a B PHY according to the present invention. In query 1100, the B PHY determines whether it has received a Self-ID packet without a Speed Code. If it has received a Self-ID packet without a Speed Code, then the B PHY marks the last port to receive Self-ID packet without a Speed Code as the path towards senior border and cancels any other ports having this status. It is contemplated that this test will take place during the Self-ID process, and may be repeated as often as necessary to satisfy the needs described herein. It is further contemplated that this marking may take place through he means described above.

If the B PHY has not received a Legacy Self-ID packet in query 1100, then the process ends.

Properly Carrying out Arbitration Requests across Multiple Clouds

As mentioned in the prior art section above, there is a need for an arbitration protocol for properly handling arbitration requests throughout multiple clouds. The following discussion will disclose a protocol whereby a border node may properly forward an arbitration request received from an Legacy cloud.

As is known by those of ordinary skill in the art, when an Legacy device requests arbitration, it may only do so at a time when it is proper. This is due to the strict arbitration protocol of the Legacy standard. Therefore, if a border node receives an arbitration request from a Legacy device or link, the border node may safely assume that the request was made properly in relation to the quiet times describe above.

However, as mentioned in the prior art section above, it is possible that a pipelined P1394b request may not be properly granted in relation to the quiet times within the Beta cloud because of the dual-phase approach used in P1394b. To solve this problem, the present invention introduces a new request, known as a Legacy request. In a preferred embodiment of the present invention, the Legacy request is deemed to be a current request and will be given a higher priority than both asynchronous and isochronous requests. Thus, the Legacy request will be forwarded to the BOSS node unimpeded and immediately granted.

According to a preferred embodiment of the present invention, when a border node receives an arbitration request from a Legacy cloud, the border node will "convert" the request into a Legacy request and forward the Legacy request to the current BOSS. Thus, because of this new type of request, a B PHY which is unaware of the current bus phase may correctly service a Legacy request without interrupting the current bus phase by incorrectly granting an out-of-phase request.

In one embodiment, the Legacy request has been encoded as a request symbol transmitted on a P1394b-compliant bus. In another embodiment, the Legacy request has been programmed and encoded in logic on a PHY.

Freeing B only PHYs from Legacy Gap Timers

As mentioned in the prior art discussion, there is a need for a protocol that transfers the gap timing requirement away from B only devices and to border devices, which already have the necessary logic built into them. The following discussion will now disclose such a protocol.

In a preferred embodiment of the present invention, when one or more border devices is present in a system, B PHYs will refrain from issuing gap tokens, and the border devices will take over the responsibility of timing the IDLE duration. Gap tokens are the BOSS equivalent to a Legacy gap event. This means that when a border device detects a duration which amounts to a subaction_sap, the border will issue an Asynch_start. Likewise, when the border device detects a duration amounting to an Arb_reset_gap, the border device will issue an Arb_reset_even/odd.

The above protocol may be implemented in a number of ways. For example, in one embodiment, all border devices automatically time the gaps and issue an event gap token when their individual timers expire.

In another embodiment, the border devices will utilize a low-priority arbitration to select one of the border devices to ensure that one border device is selected as BOSS before an extended period of IDLE appears on the bus.

In a preferred embodiment, the senior border as disclosed above, is given responsibility for issuing gap tokens in the Beta cloud. Normally, when a P1394b PHY has finished all of its tasks, it would issue a phase change. However, in this embodiment, when a P1394b PHY is finished with its tasks, it turns over control to the senior border node. The senior border can then ensure compliance with the gap timers. Recall from the discussion of the senior borders that all P1394b PHYs within the Beta cloud will know the path to their senior border node.

Restoring the Local Root as BOSS

In a preferred embodiment of the present invention, when a hybrid bus is present, control within a Beta cloud will be passed to the senior border node within the cloud. Thus by passing control to the senior border node, the Beta cloud is assured that arbitration will be performed correctly, even if the senior border node has a Legacy cloud as a parent.

To accomplish this, the present invention discloses a protocol in which a BOSS device which is transmitting immediately communicates one of two intentions regarding its BOSS status, or "BOSSship", at the end of its transmission: 1) either explicitly grant BOSSship to a specific port, or 2) pass control towards the senior border node. By passing control towards the senior border node, this protocol insures that eventually control will revert to a device which may proxy between clouds in a hybrid bus. Thus, after transmitting, there is no longer a question as to who has control of the bus, and race conditions are thus prevented.

A preferred embodiment of the present invention is implemented through the use of new packet-ending symbols, shown in Table 1. In one embodiment, these symbols have been encoded and transmitted on a bus. In another embodiment, these symbols have been programmed and encoded in logic on a PHY.

TABLE 1

Packet-ending symbols according to the present invention

| Symbol Name | Comment |
|---|---|
| GRANT | The end of a subaction has been reached, and the receiving node is being elected BOSS. |
| DATA_NULL | The bus is being actively granted to another PHY, and a packet will follow. Therefore, the receiving node is not being elected BOSS and must not let its IDLE timers |

TABLE 1-continued

Packet-ending symbols according to the present invention

| Symbol Name | Comment |
|---|---|
| | time. |
| DATA_END | When sent out a senior port: The end of a subaction has not been determined, and the receiving node connected to the senior port is being elected BOSS; and When sent out a junior port: the receiving node connected to the junior port is not being elected BOSS, should start or continue timing the IDLE gap. |

FIG. 12 shows how the symbols in Table 1 are utilized. In query 1200, the current BOSS determines if an end of subaction ("EOS") has been reached. If an EOS has been reached, then in query 1202, the current BOSS determines if there are any in-phase requests to grant. If there are in-phase requests to grant, then in act 1204 the current BOSS sends a GRANT symbol to the granted port, and a DATA_NULL symbol to all other ports. If there are no in-phase requests to grant, then in query 1203 the node determines whether it is the senior border node. If the node is the senior border node, then in act 1207 the node send a Data End out all ports.

If the node is not the senior border node, then in act 1206 the current BOSS sends a GRANT symbol out its senior port, and a DATA_END symbol out its junior ports. Thus, this process achieves the goal of returning BOSSship towards the senior border node, while communicating to the receiving node connected to the senior port that an EOS was achieved.

Referring still to FIG. 12, if no EOS was reached in query 1200, then in act 1208 the current BOSS sends a DATA_END symbol out all ports. This returns control to the senior node, while allowing the IDLE timers to continue.

Thus, in an example where an acknowledge packet is never received, control will be returned to the local senior border node, which has the capability to perform any necessary recovery. This recovery can occur even if the senior border node has a Legacy node as a parent.

BOSS OK to Grant

As mentioned in the prior art section, there is a need for a protocol to ensure compatibility when arbitration takes place on a hybrid bus. Such a protocol will now be discussed.

A protocol according to the present invention comprises two variables: BOSS and OK_TO_GRANT. Prior to issuing a grant, the BOSS will check the status of cach of these variables. In a first embodiment of the present invention, only if both are true will the BOSS be able to issue a grant for pipelined P1394b request. In a second embodiment of the present invention, the BOSS may grant a Legacy request when only the BOSS variable is set.

In a preferred embodiment, these variables have been programmed and encoded in logic on a PHY.

BOSS

In the present invention, the BOSS variable indicates whether the BOSS has BOSSship—the right to issue a grant. The BOSS indicator can be moved freely within a cloud between nodes. The BOSS indicator can be set in one of two ways: 1) a P1394b-compliant node which receives a GRANT either implicitly or explicitly; or 2) a node which first transmits a packet into a Beta cloud automatically becomes BOSS of that cloud. An explicit grant occurs by way of receiving a grant symbol, while an implicit grant occurs by way of receiving a DATA_END symbol from a junior port.

Furthermore, the present invention relates to a protocol which determines when a BOSS device must surrender its BOSSship by resetting its BOSS indicator. In one embodiment, whenever a packet is received from a P1394b port, the receiving PHY ceases to be BOSS. In another embodiment, whenever an implicit or explicit grant is issued, the issuing PHY ceases to be BOSS.

Thus, the BOSS indicator indicates whether the BOSS has acquired the exclusive right to issue a grant, either explicitly or implicitly. However, just because the BOSS has the right to issue a grant does not necessarily mean that it is safe to do so within a hybrid bus.

OK TO GRANT

FIG. 13 is a profile of an OK_TO_GRANT indicator according to the present invention. FIG. 13 has three rows indicating the status of the bus at a certain moment, labeled End of Isoch (end of the isochronous packet), !EOS (not end of asynchronous subaction), and EOS (end of asynchronous subaction). FIG. 13 further has two columns labeled B bus, and hybrid bus.

At the intersection of the columns and rows in FIG. 13 are waveform representations of the OK_TO_GRANT indicator. When the waveform is represented as being high, the OK_TO_GRANT indicator is set, and when the waveform is represented as being low, the OK_TO_GRANT indicator is reset.

B Bus/End of Isoch

Referring still to FIG. 13, a case representing a B bus after the end of an isochronous packet is shown according to the present invention. On a B bus, and at the end of an isochronous packet represented as the EOP time marker on the waveform, there is no need to wait for an acknowledgment. As soon as the EOP arrives, the OK_TO_GRANT indicator will be set. Therefore, if a node has its BOSS indicator set, at the end of an isochronous packet the node may issue a grant according to the present invention.

B Bus/!EOS

This example represents the case where an EOP has arrived that was not observed to be the end of a subaction. By way of example, this may occur when the end of a primary packet has been marked with a data end. This illustrates the example where an ACK is expected but is missing. On a B bus, the BOSS must wait some predetermined amount of time before it may issue a grant, just in case an ACK arrives. This time period is represented by the time period shown between the EOP and ACK missing time markers prior to the OK_TO_GRANT being set. According to a preferred embodiment of the present invention, after the predetermined amount of time, the BOSS will assume that the ACK is missing, and will set its OK_TO_GRANT indicator.

B Bus/EOS

Referring still to FIG. 13, a case representing a B bus after the end of a subaction is shown according to the present invention. By way of example, this may occur where the end of a packet has been marked with a GRANT. In this case, at the end of a packet, the OK_TO_GRANT will be set according to a preferred embodiment of the present invention.

Hybrid Bus/End of Isoch

Referring now to FIG. 13 in the Hybrid Bus column, a case representing a hybrid bus after the end of an isochronous packet is shown according to the present invention. After the end of an isochronous packet in a hybrid bus, there is an instant in time where the BOSS may safely issue a grant. This instant in time is represented in FIG. 13 by the momentary setting of the OK_TO_GRANT indicator at the EOP time marker. After this instant, the OK_TO_GRANT indicator is reset until the end of the subaction gap plus the arb_delay (quiet time #1). This ensures protection of the quiet time #1. Then, after quiet time #1, the BOSS momentarily may safely issue a grant. This is represented by a momentary setting of the OK_TO_GRANT indicator at the time marker labeled SAG. During the time period immediately after the momentary setting of the OK_TO_GRANT indicator, after the subaction gap and the arb_delay, and immediately up to, but not including the arbitration reset gap and the arb_delay (quiet time #2), the BOSS may not safely issue a grant. This is shown by the OK_TO_GRANT indicator being reset during quiet time #2. Finally, after quiet time #2, the BOSS may safely issue a grant. This is represented by the OK_TO_GRANT indicator being set at the time marker labeled ARG.

Hybrid Bus/!EOS

Referring still to FIG. 13, a case representing a hybrid bus where the end of an subaction is missing is shown according to the present invention. When the end of an subaction is missing in a hybrid bus, the BOSS may not safely issue a grant, and must wait through the end Then, after quiet time #1, the BOSS momentarily may safely issue a grant. This is represented by a momentary setting of the OK_TO_GRANT indicator at the time marker labeled SAG. During the time period immediately after the momentary setting of the OK_TO_GRANT indicator, after the subaction gap and the arb_delay, and immediately up to, but not including the arbitration reset gap and the arb_delay (quiet time #2), the BOSS may not safely issue a grant. This is shown by the OK_TO_GRANT indicator being reset during quiet time #2. Finally, after quiet time #2, the BOSS may safely issue a grant. This is represented by the OK_TO_GRANT indicator being set at the time marker labeled ARG.

Hybrid Bus/EOS

Referring still to FIG. 13, a case representing a hybrid bus after the end of an subaction is shown according to the present invention. After the end of a subaction in a hybrid bus, the BOSS may safely issue a grant during quiet time #1. This is one exception to the general rule of not violating the quiet times. This is similar to the ack-accelerated arbitration in the P1394a standard. This is indicated by the setting of the OK_TO_GRANT indicator at time marker EOP through time marker SAG. During the time period immediately after the setting of the OK_TO_GRANT indicator, after the subaction gap and the arb_delay, and immediately up to, but not including the arbitration reset gap and the arb_delay (quiet time #2), the BOSS may not safely issue a grant. This is shown by the OK_TO_GRANT indicator being reset during quiet time #2. Finally, after quiet time #2, the BOSS may safely issue a grant. This is represented by the OK_TO_GRANT indicator being set at the time marker labeled ARG.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. In a communications system comprising at least one serial bus, at least one node operating only in a first mode, and at least one other node operating in a second mode, a border apparatus comprising:
a first port operatively coupled to said at least one node operating in said first mode;
a second port operatively coupled to said at least one node operating in said second mode; and
a transfer apparatus adapted to transfer gap timing requirements associated with said at least one node operating in said second mode to said border apparatus, said transfer apparatus further adapted to, upon completion of transfer tasks, turn over control to a senior border apparatus operating in said second mode for management of gap timing by said senior border apparatus.

2. The border apparatus of claim 1, wherein said border apparatus operates according to a hybrid bus communication protocol.

3. The border apparatus of claim 2, wherein said system comprises a full-duplex communications system.

4. The border apparatus of claim 2, wherein said first mode comprises a legacy mode, and said second mode comprises a mode which is accelerated relative to said legacy mode.

5. The border apparatus of claim 2, wherein said hybrid bus communication protocol comprises regulating an idle duration of said at least one other node operating in said second mode.

6. The border apparatus of claim 5, wherein said hybrid bus communication protocol further comprises:
detecting a first idle duration which is related to a subaction gap, and issuing an asynchronous start signal in response thereto; and
detecting a second idle duration which is related to an arbitration reset gap, and issuing an arbitration reset signal in response thereto.

7. The border apparatus of claim 2, wherein said hybrid bus communication protocol is further adapted to enforce proper arbitration between said border apparatus and said at least one node operating in said second mode, even if said at least one node operating in said first mode comprises a parent of said border apparatus.

8. The border apparatus of claim 4, wherein said legacy mode comprises a mode compliant with IEEE Std. 1394a, and said accelerated mode comprises a mode compliant with IEEE Std. 1394b.

9. In a communications system comprising at least one serial bus, a method of transferring gap timing requirements to a border apparatus, comprising:
operatively coupling a first port of said border apparatus to a node operating in a first mode;
operatively coupling a second port of said border apparatus to a node operating in a second mode;
detecting a duration of idle timing;
if said duration is equal to a first predetermined value, then issuing a first message; and
if said duration is equal to a second predetermined value, then issuing a second message;
if no senior node is connected to said node operating in said second mode of said border apparatus, then transferring gap timing requirements associated with said node operating in said second mode to said border apparatus; and
if a senior node is connected to said node operating in said second mode of said border apparatus, then transferring control of gap timing requirements to said senior node.

10. The method of claim 9, further comprising: operating said border apparatus according to a hybrid bus communication protocol.

11. The method of claim 10, wherein said communication system comprises a full-duplex communication system.

12. The method of claim 11, wherein said first mode comprises a legacy mode, and said second mode comprises a mode which is accelerated relative to said legacy mode.

13. The method of claim 12, wherein said legacy mode comprises a mode compliant with IEEE Std. 1394a, and said accelerated mode comprises a mode compliant with IEEE Std. 1394b.

14. The method of claim 10, wherein said hybrid bus communications protocol comprises regulating an idle duration of said node operating in said second mode.

15. The method of claim 14, wherein said hybrid bus communication protocol further comprises:
enforcing proper arbitration between said border apparatus and said node operating in said second mode, even if said node operating in said first mode comprises a parent of said border apparatus.

16. A full duplex communications system, comprising:
a serial bus;
at least one node operating in a first mode operatively coupled to said serial bus;
at least one other node operating in a second mode operatively coupled to said serial bus; and
a plurality of border apparatus each comprising:
a first port operatively coupled to said at least one node operating in said first mode; and
a second port operatively coupled to said at least one node operating in said second mode;
wherein each of said plurality of border apparatus utilizes low-priority arbitration to select one of said plurality of border apparatus as a boss node before an prescribed period of idle time appears on said serial bus, said boss node being responsible for arbitration on said serial bus.

17. The full duplex communications system of claim 16, wherein said border apparatus operates according to a hybrid bus communication protocol.

18. The full duplex communications system of claim 16, wherein said first mode comprises a legacy mode, and said second mode comprises a mode which is accelerated relative to said legacy mode.

19. The full duplex communications system of claim 18, wherein said legacy mode comprises a mode compliant with IEEE Std. 1394a, and said accelerated mode comprises a mode compliant with IEEE Std. 1394b.

20. The full duplex communications system of claim 17, wherein said hybrid bus communication protocol comprises regulating an idle duration of said at least one other node operating in said second mode.

21. The full duplex communications system of claim 20, wherein said hybrid bus communication protocol further comprises:
detecting a first idle duration which is related to a subaction gap, and issuing an asynchronous start signal in response thereto; and
detecting a second idle duration which is related to an arbitration reset gap, and issuing an arbitration reset signal in response thereto.

22. The full duplex communications system of claim 17, wherein said hybrid bus communication protocol is further adapted to enforce proper arbitration between said border apparatus and said at least one other node operating in said second mode, even if said at least one node operating in said first mode comprises a parent of said border apparatus.

23. For use in a communications system comprising at least one serial bus, at least one node operating in a first mode, and at least one other node operating in a second mode, a border apparatus comprising:
a first interface adapted for data communication with said at least one node operating in said first mode;
a second interface adapted for data communication with said at least one node operating in said second mode;
apparatus adapted to, at said border apparatus, receive gap timing requirements associated with said at least one node operating in said second mode; and
apparatus adapted to, at said border apparatus, detect a duration of idle timing and:
if said duration is equal to a first predetermined value, then issue a first predetermined message;
if said duration is equal to a second predetermined value, then issue a second predetermined message; and
apparatus adapted to, at said border apparatus, transfer gap timing requirements associated with said node operating in said second mode responsive to whether a senior border node operating in said second mode is connected to said at least one serial bus.

24. The border apparatus of claim 23, wherein said border apparatus operates according to a hybrid bus communication protocol.

25. The border apparatus of claim 24, wherein said system comprises a full-duplex communications system.

26. The border apparatus of claim 24, wherein said second mode comprises a mode which is accelerated in at least data rate relative to said first mode.

27. The border apparatus of claim 24, wherein said hybrid bus communication protocol comprises regulating an idle duration of said at least one other node operating in said second mode.

28. The border apparatus of claim 24, wherein said hybrid bus communication protocol is further adapted to enforce proper arbitration between said border apparatus and said at least one node operating in said second mode, even if said at least one node operating in said first mode comprises a parent of said border apparatus.

29. The border apparatus of claim 26, wherein said first mode comprises a mode compliant with IEEE Std. 1394a, and said accelerated mode comprises a mode compliant with IEEE Std. 1394b.

30. The border apparatus of claim 23, wherein at least one of said nodes operating in said first or second modes is adapted for hot plug connection to said border apparatus or a device interposed in a data communication path there between.

31. The border apparatus of claim 23, wherein said first mode comprises a first high-speed serialized bus protocol, and said second mode comprises a second high-speed serialized bus protocol, said first and second protocols not being identical.

32. The border apparatus of claim 23, wherein at least one of said nodes operating in said first or second modes comprises a hand-held video capable device.

33. The method of claim 9, wherein said first message comprises a start message, and said second message comprises a reset message.

34. The method of claim 9, wherein said second mode comprises a mode which is accelerated relative to said first mode.

35. For use in a communications system comprising at least one serial bus, at least one node operating only in a first mode, and at least one other node operating in a second mode, border apparatus comprising:
a first interface operatively coupled to at least one node operating in said first mode;
a second interface operatively coupled to said at least one node operating in said second mode; and
transfer apparatus adapted to transfer gap timing requirements associated with said at least one node operating in said second mode to said border apparatus, said transfer apparatus further adapted to turn over control to a senior border apparatus operating in said second mode for management of gap timing.

36. The apparatus of claim 35, wherein said second mode comprises a mode which is accelerated relative to said first mode.

37. The apparatus of claim 36, wherein said first mode comprises a mode compliant with IEEE Std. 1394a, and said second mode comprises a mode compliant with IEEE Std. 1394b.

38. In a communications system comprising at least one serial bus, a border apparatus operatively coupled to a node operating in a first mode and to another node operating in a second mode, said another node having no senior node operatively coupled thereto, a method of transferring gap timing requirements comprising:

evaluating a duration of idle timing;

based at least in part on said evaluating, issuing a message of either a first type or of a second type to one of said nodes; and transferring gap timing requirements associated with said node operating in said second mode to said border apparatus.

39. The method of claim 38, wherein said second mode comprises a mode which is accelerated relative to said first mode, and said first type of message performs a different function than said second type of message.

40. The method of claim 38, wherein said evaluating comprises determining if said duration meets one of first or second criteria.

41. In a communications system comprising at least one serial bus, a border apparatus operatively coupled to a node operating in a first mode and to another node operating in a second mode, said another node having a senior node operatively coupled thereto, a method of transferring gap timing requirements comprising:

evaluating a duration of idle timing;

based at least in part on said evaluating, issuing a first or second message to at least one of said nodes that is consistent with said at least one node operating in either said first mode or said second mode, respectively; and transferring control of gap timing requirements to said senior node.

42. The method of claim 41, wherein said second mode comprises a mode which is accelerated relative to said first mode, and said first type of message performs a different function than said second type of message.

43. The method of claim 41, wherein said evaluating comprises determining if said duration meets one of first or second criteria.

* * * * *